INVENTOR.
WILFORD B. BURKETT
ROBERT V. JACKSON
BY
Christie, Parker & Hale
ATTORNEYS.

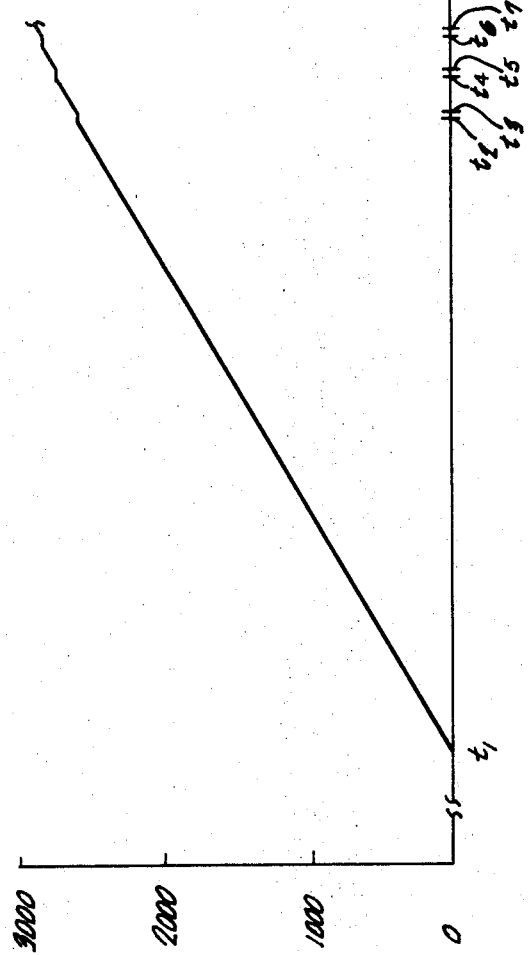
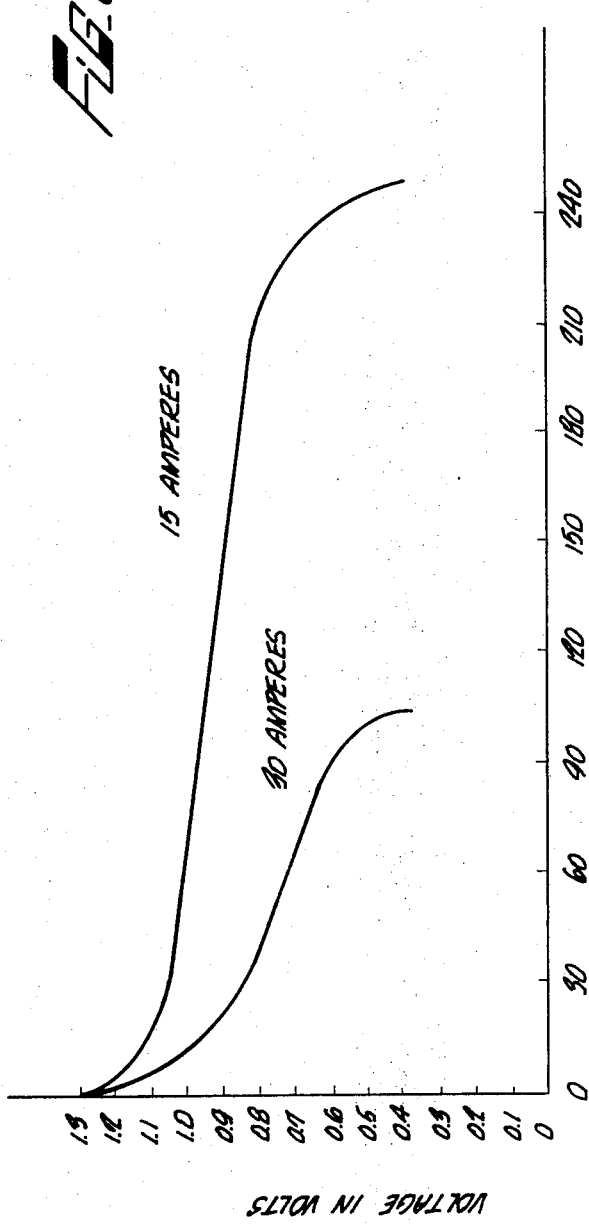

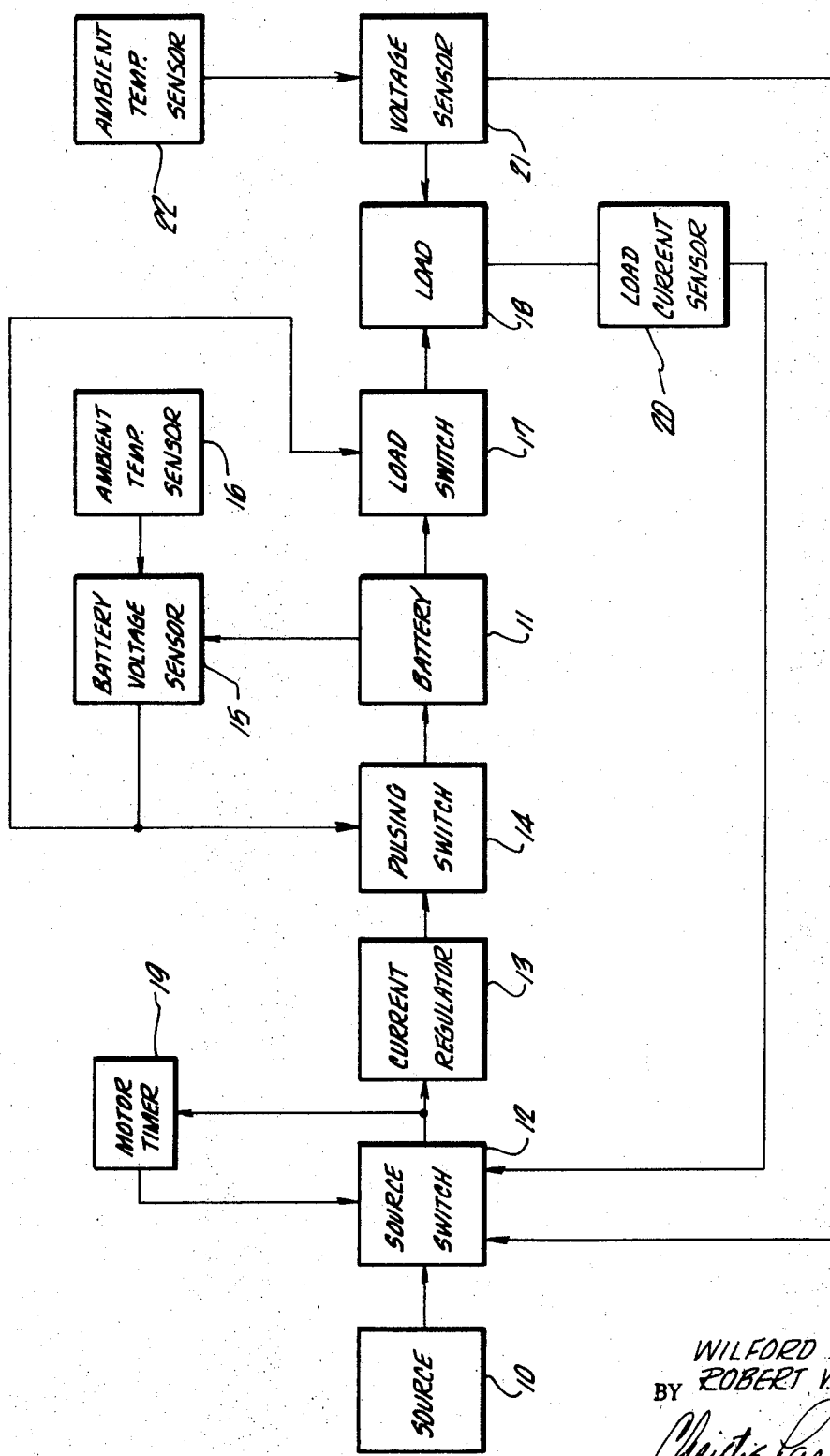

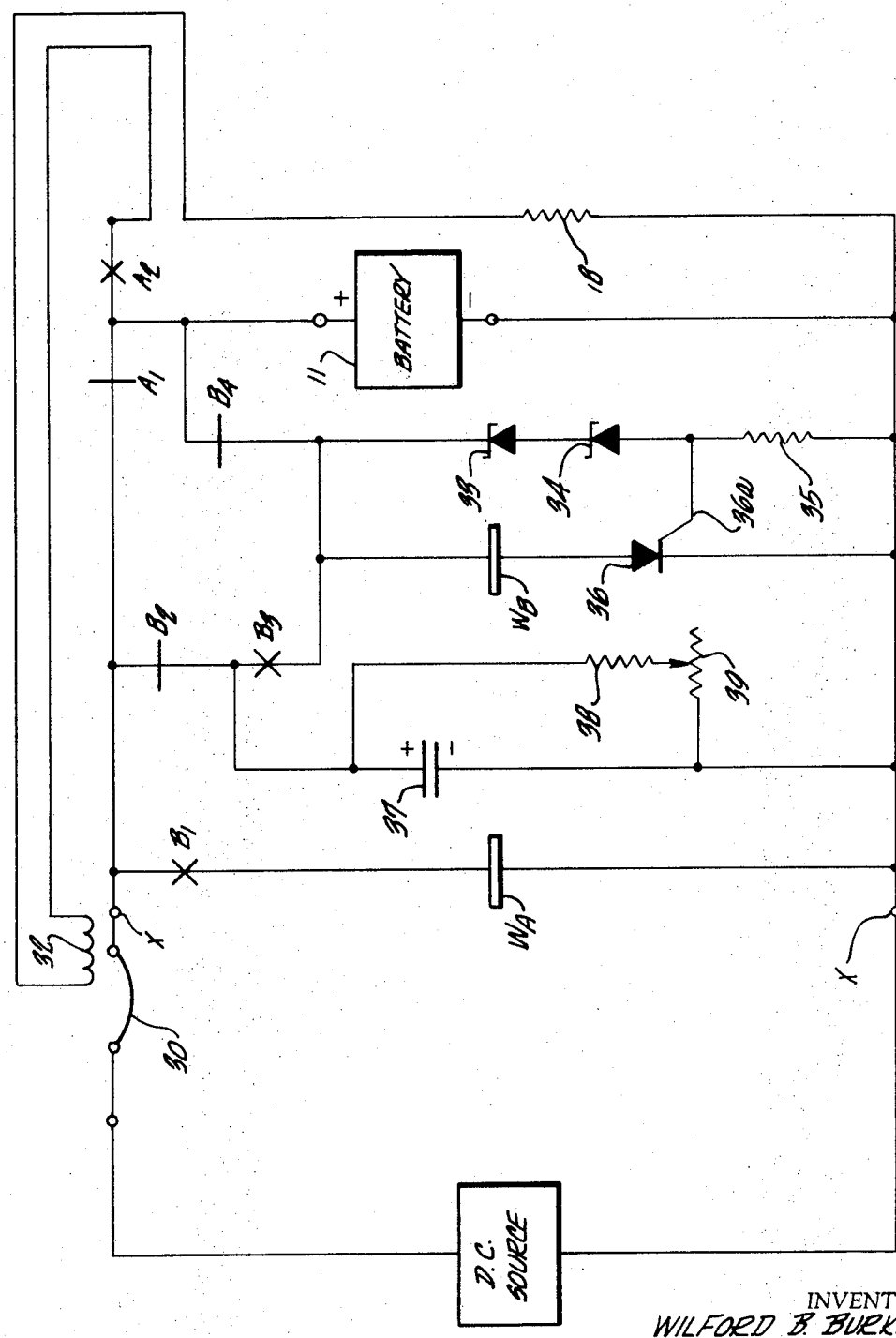

INVENTORS.
WILFORD B. BURKETT
ROBERT V. JACKSON
BY
Christie, Parker & Hale
ATTORNEYS.

United States Patent Office 3,517,293
Patented June 23, 1970

3,517,293
RAPID CHARGING OF BATTERIES
Wilford B. Burkett, Pacific Palisades, and Robert V. Jackson, Los Angeles, Calif., assignors to McCulloch Corporation, Los Angeles, Calif., a corporation of Wisconsin
Filed Jan. 31, 1967, Ser. No. 612,995
Int. Cl. H02j 7/00
U.S. Cl. 320—14
14 Claims

ABSTRACT OF THE DISCLOSURE

A battery is charged by imposing an increasing charge on the battery by charging during a plurality of charge intervals and by providing battery discharge intervals interspersed with the charge intervals and causing the frequency of the discharge intervals to increase as the charge on the battery progresses. Additionally, the duration of intervals of charge may be diminished as the charge on the battery increases whereby the quotient of the duration of the charging interval divided by the duration of a succeeding discharge interval diminishes as the charge on the battery increases.

BACKGROUND OF THE INVENTION

Field of the invention

This invention relates to a method and circuit for quick-charging batteries, and is particularly adapted to the charging of batteries in a minimum amount of time.

Batteries are employed more and more as the power source for all types of devices including many portable devices and stationary devices. For example, batteries are presently again being considered for powering automobiles. Batteries already power both large and small devices, for example golf carts in the category of large devices, and toothbrushes and miniature hearing aids in the category of smaller devices. Batteries are also the source of power for the many cordless appliances on the market. However, many more cordless appliances and other battery-powered devices would be in use if it was not for the long period of time required to charge the batteries. Furthermore, those in use would be more useful but for the charging limitations. Known methods and apparatus for charging electric batteries involve excessively long periods of time, and when attempts are made to shorten the time period, involve excessive gas generation and increase in battery temperature. While gas generation and increase in temperature with a resultant increase in pressure, may be permissible for vented rechargeable batteries they could easily cause distortion of a sealed battery, such as a battery comprised of nickel-cadmium cells. Limiting factors in the charging of any cells, and particularly in the charging of sealed cells, is the amount of gas generated and the degree of temperature rise during the charging process. These, in turn, generally limit the rate at which charging of the cells can be executed so that considerable time is required for charging the battery before the battery can be put to use again in the device to which it supplies power.

A typical example is the portable electric drill that often employs a sealed nickel-cadmium cell of the type C capacity. The recommended time in which to charge these cells varies between two hours and sixteen hours. For example, one of the manufacturers of this type of cell recommends that it be charged for sixteen hours at a constant current rate of 150 milliamperes, which is one-tenth of C, C being the nominal rate of discharge current for one hour to a selected end voltage such as one volt per cell, or in short, the nominal one-hour rate of the cell as established by the manufacturer thereof. A type C cell is normally rated at 1.5 ampere-hours and, thus has a C rate of 1.5 amps. These data are set out in the catalog entitled "General Electric Rechargeable Sealed Nickel-Cadmium Batteries" (Catalog No. GEA 7678A).

However, when the equipment being powered by a battery source is being used in a production line, a barber shop, or in a home, it is generally not acceptable to set the equipment aside and wait sixteen hours for the battery to be charged before the equipment can again be placed in use.

SUMMARY OF THE INVENTION

In accordance with the present invention batteries are charged in a very short time by employing the method that comprises the steps of imposing an increasing charge on the battery by charging the battery during a plurality of charging intervals and providing other intervals interspersed with the charging intervals and causing the frequency of the other intervals to increase as charging of the battery progresses. Preferably, the other intervals are battery-discharge intervals whereby the chargeability of the battery at a high rate is enhanced.

Additionally, the method includes the steps of causing the duration of intervals of charging to diminish as the charge on the battery increases and causing the quotient of the duration of a charging interval divided by the duration of a succeeding discharging interval to diminish as the charge on the battery increases.

Further, in accordance with the present invention batteries are charged in a very short time by employing a battery-charging circuit comprising a source of charging current and circuit means for periodically transmitting charging current from the source to the battery to apply charging intervals to the battery which are operable to impose an increasing charge on the battery with the circuit means being operable to provide other intervals interspersed with the charging intervals with the frequency of the other intervals increasing as charging of the battery progresses. The source of current may provide current at a rate in excess of the nominal one-hour rate of the cells of the battery. Additionally, the circuit may further comprise a load and circuit means for alternately connecting the source and the load to the battery to impose an increasing charge on the battery with the circuit means being operable to connect the load to the battery with a frequency which increases as charging of the battery progresses.

Additionally, the circuit means may be operable to connect the source with the battery with the duration of periods of connection between the battery and the source becoming shorter as charging of the battery progresses and with the circuit means being operable to cause a quotient equal to the duration of a period of time during which the source is connected to the battery divided by the duration of a succeeding period of time during which the load is connected to the battery to diminish as charging of the battery progresses.

BRIEF DESCRIPTION OF THE DRAWING

The above and other features and advantages of the present invention may be understood more clearly and fully upon consideration of the following specification and drawings, in which:

FIG. 4 is a curve showing the energy put into the battery during a charging interval and the energy removed during a discharging interval in accordance with the present invention;

FIG. 5 is a block diagram of an apparatus for charging a battery in accordance with the method for rapid charging in accordance with the present invention;

FIG. 6 is a chart showing two discharge curves of a typical sealed nickel-cadmium cell;

FIG. 7 is a schematic diagram of a preferred embodiment of the battery charger in accordance with the present invention.

DESCRIPTION OF THE PREFERRED EMBODIMENTS

Figure 1:
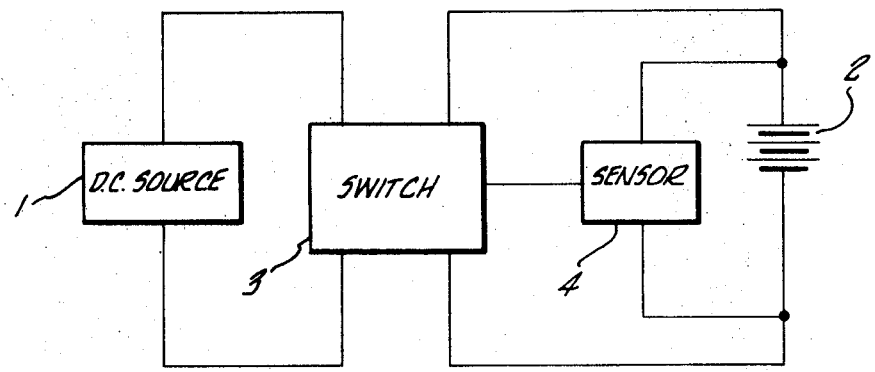
FIG. 1 is a block diagram of an apparatus for quick-charging a battery in accordance with the present invention.

In the majority of the applications where batteries are employed as the power source, it is desirable to charge the batteries in the shortest possible time. A block diagram of a preferred circuit for charging batteries in a very short period of time is shown in FIG. 1. The circuit includes a direct-current voltage source 1, which may include, for example, an alternating-current generator with a rectifier and filter across the output terminals. The output of direct-current voltage source 1 is applied to the battery 2 through a pulsing switch 3. The repetition rate of the charging current pulses created by the pulsing switch is directly dependent upon the time in which it takes the terminal voltage of the battery to reach a predetermined value. The terminal voltage of the battery is sensed by a sensor 4 which is coupled to and controls the operation of the pulsing switch 3.

The present invention will be described by using a typical Sub-C sealed nickel-cadmium cell, as an example, but it is to be understood to be applicable to the charging of any cell or any battery employing a plurality of secondary cells. A Sub-C nickel-cadmium cell, such as the one used in battery 41 B001KD06 manufactured by the General Electric Company has a nominal voltage of 1.2 volts per cell, and a nominal capacity of one ampere hours based upon a C-rate or discharge rate of one ampere for one hour to an end voltage of one volt. The manufacturer recommends that this cell be charged at a C/10 rate or at 100 milliamperes for a period of sixteen hours. This time is excessive as this cell can be charged in considerably less time than the recommended sixteen hours by employing the method of the present invention.

The method of the present invention of quick-charging such a sealed cell can be advantageously employed to charge the cell to nearly 100% capacity in approximately twenty minutes and well over 90% usable capacity in less than twenty minutes.

All secondary cells, in general, have a certain charge efficiency, which is a measure of the amount of usable energy out of the cell for a given amount of energy put into the cell. For example, a typical Sub-C sealed nickel-cadmium cell has a rated capacity of 1.0 ampere-hours at a discharge rate of one ampere for one hour. The rated capacity and the usable energy available is considerably less for higher discharge rates. If 80% of the rated capacity or 2880 ampere-seconds are put back into a completely discharged Sub-C cell and the cell thereafter delivers 2592 ampere-seconds, its charge efficiency would be 90%.

By employing the method of the present invention it is possible to get a very high charge efficiency and to charge the cell in a very short period of time.

Figure 2:
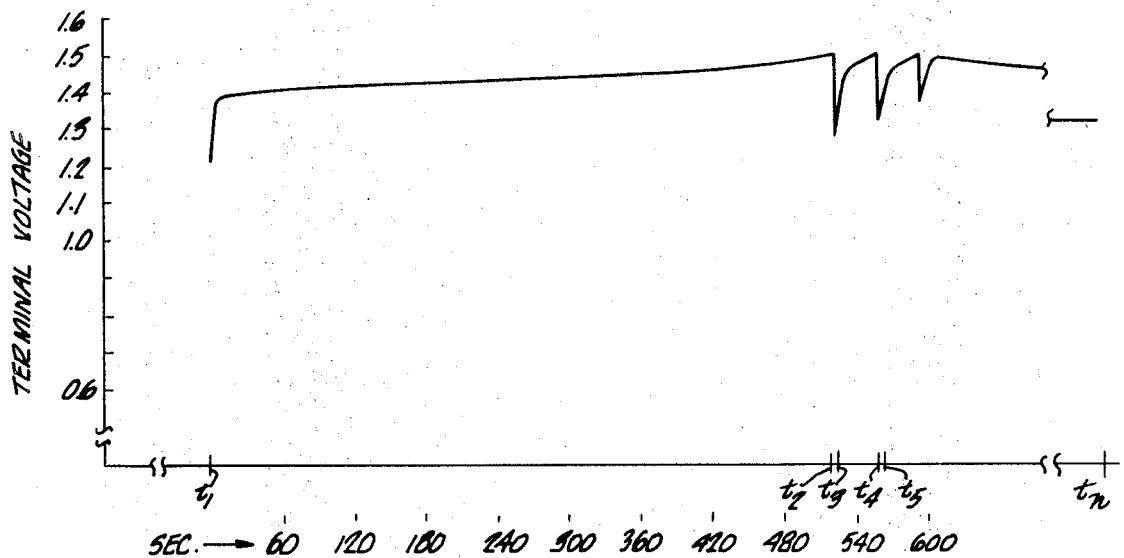
FIG. 2 is a curve showing the terminal voltage of a battery being charged in accordance with the present invention.
Figure 3:
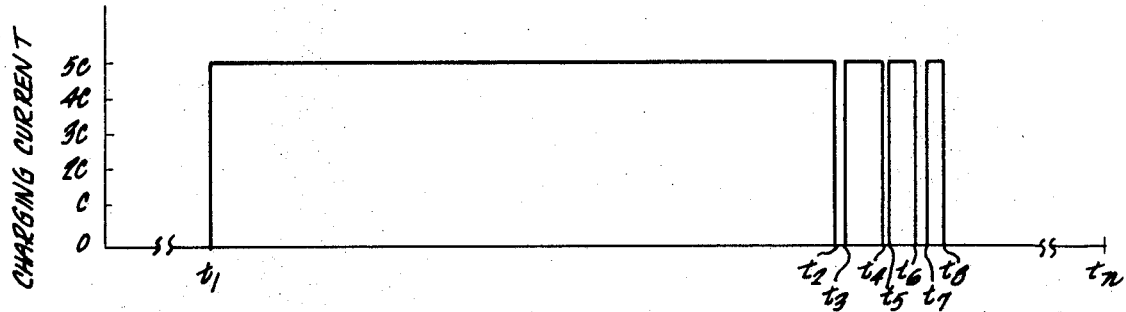
FIG. 3 is a curve showing the charging current and which is intended to be illustrative of the charge interval-discharge interval relationship in accordance with the present invention.

The voltage at the terminals of the cell, the charging current applied to the cell, and the energy put into the cell for a typical Sub-C sealed nickel-cadmium cell being quick-charged in accordance with the method of the present invention are shown in FIGS. 2, 3, and 4, respectively. The charts in these figures are all on the same time base, which time base is shown in FIG. 2.

Referring to FIG. 3, the charging current is applied at a selected rate in excess of the one-hour rate of the battery and ideally at the optimum rate for charging the battery. The optimum rate is dependent upon the initial charge condition of the cell, the age of the cell, and the internal construction of the cell. For example, some cells have higher internal resistances than others and consequently excessive heat may be generated if too high a charge rate is employed. It is believed that the optimum charge rate will restore the most usable energy in the cell in the shortest amount of time.

As an example, the apparent optimum rate for charging the Sub-C cell used in the General Electric battery 41B001KD06, appears to be approximately five amperes or five times C. There is believed to be an optimum charging current for each category of cell, the categories generally being established by the rated capacity of the cell, which is dependent upon the size of the cell, the composition of the cell and the amount of usable active material in the cell.

A limiting factor in the charging of any cell and particularly in charging sealed cells, is the amount of gas generated during the charging process. In nickel-cadmium cells for example, the critical factor is generally the evolution of hydrogen gas, since the oxygen that evolves at the positive nickel electrode during the charging process readily reacts with the negative cadmium electrode so that the evolution of oxygen alone is generally not a limiting factor.

In the method of the present invention, the charging current is removed or interrupted when one of the parameters that varies during the application of the charging current reaches a critical value. The parameters that vary during the application of the charging current are the terminal voltage, the internal pressure, and the temperature of the cell. For example, a voltage change results across the terminals of a sealed nickel-cadmium cell as the electrodes change during the charging process. This voltage change may be monitored in accordance with the method of the present invention to prevent cell failure. It is important to terminate charge at high rates before the evolution of excessive hydrogen gas.

In a typical Sub-C cell excessive gassing starts to make place at a terminal voltage in excess of 1.5 volts at room temperature or approximately 70° Fahrenheit. Therefore, in accordance with the method of the present invention the terminal voltage is monitored, and before it exceeds the critical value of 1.5 volts the charging current is interrupted. This is shown in FIG. 2 which is a curve of terminal voltage versus time with the charging current initially applied at time $t_1$. The charging current curve is shown in FIG. 3 and has the same base as the terminal voltage curve of FIG. 2. The curves of FIGS. 2 and 3 were curves that are produced during the charging of an actual Sub-C cell and are therefore representative of typical curves produced when quick-charging cells in accordance with the method of the present invention.

The cell of FIG. 2 was substantially completely discharged and had a terminal voltage with the load applied of approximately four-tenths of a volt as compared to the fully charged terminal voltage of approximately 1.3 volts. With the load removed, and after a period of time the terminal voltage with no load drifted back up to approximately 1.23 volts where it remained. Thus, the terminal voltage was approximately 1.23 volts when the charging current was first applied at time $t_1$. A charging current of five amperes or five times C was applied as shown in FIG. 3. The terminal voltage rises quickly upon the application of a charging current and levels out and thereafter increases slowly as the energy is restored in the cells.

The terminal voltage gradually increases to the critical value of 1.5 volts at which time the charging current is interrupted and which time is shown as time $t_2$ on the curves of FIGS. 2 through 4. It is believed to be desirable during this initial application of charging current to restore as much energy in the cells in as short a time as possible. It has been found that by employing the high charging current at least 35% of the total energy can be restored during the initial application of charging current. This is shown in FIG. 4, which is a curve showing the energy put in during each charge interval and removed during each discharge interval. During the time between $t_1$ and $t_2$ approximately 2600 amperseconds were put into the type Sub-C cell, which is approximately 87% of the rated capacity of the cell at a discharge rate of five times C.

The next step in the method of quick-charging is the application of a load to the cell or a reversal of the current through the cell to increase the amount of charge the cell will accept. The cell is discharged at a high rate, for example at a rate of 20 amperes for a short period of time, which period of time for the cell of FIGS. 2 and 3 was three seconds. The shorter the time in which the discharge takes place the sooner the charging current can be reapplied and the full charge of the cell be reached.

During this discharging period some work has to be done so that there is a limitation on the shortness of the period. In FIG. 4 it is seen that between times $t_2$ and $t_3$ a small amount of energy is removed from the cell during this period. It is believed that the discharging of the cell depolarizes the electrodes and electrolyte to permit faster charging. The depolarizing removes the gases that may be formed during each charging pulse. The greater the discharge current the shorter the period of time required to prepare the cell for the next pulse of charging current.

The reversible electrochemical and chemical processes that take place during the charging of a cell can proceed only so fast. If too high a charging current is applied to the cell, some of the current will not perform useful work and will only be used to produce heat and may even produce an excess of gases that can rupture a sealed cell or break down the electrolyte.

At the end of the discharging period, which is indicated on the curves of FIGS. 2 through 4 as time $t_3$, the high charging current is again applied to more fully charge the cell. The high charging current is applied to the cell until the terminal voltage again reaches the critical value at which point the charging current is interrupted and the discharging step is again undertaken. The steps are repeated until the desired amount of charge is restored in the cell or until the cell is completely recharged or for some selected period of time.

Since over 90% of the rated capacity can be restored to the cells by the quick-charging method of the present invention in less than twenty minutes, it may be desirable to discontinue the charge at this time to place the cell or battery back into service. Thus, a programmed charge cycle may be employed whereby the steps of the method of quick-charging are repeated during a selected interval, such as for example the ten-minute interval, at which time the cell may be removed from the charging circuit. On the other hand, it may be desirable to completely charge the cell. In this case, the steps in the quick-charging method are repeated until the terminal voltage of the cell or battery with a known load across the cell or battery reaches a value indicating the fully charged or substantially fully charged condition. The battery charger may then be shut off or disconnected from the cell or battery either manually or automatically.

A battery charger for quick-charging a cell or a battery in accordance with the present invention is shown in FIG. 5 in block form. The charger will be described in connection with a battery which is of course comprised of one or more cells but it is to be understood that the charger may also be used for charging other rechargeable electrochemical power sources.

The battery charger of FIG. 5 includes a source 10 that provides a direct-current charging current for the battery. The source 10 may be a direct-current generator or it may be a rectifier connected to an alternating-current source. In any case, the source 10 is coupled to the battery 11 through a source switch 12, a current regulator 13, and a pulsing switch 14. The current regulator 13 may be omitted from the battery charger and the source coupled directly to the pulsing switch 14 through the source switch 12.

A battery voltage sensor 15 is directly coupled to the battery 11 to monitor the terminal voltage across the battery as the battery is charged. The battery voltage sensor 15 is coupled to the pulsing switch 14 so that the pulsing switch 14 will operate when the terminal voltage across the battery reaches the critical value above which excessive gassing may take place in the battery. Therefore, the terminal voltage parameter of the three parameters of the battery that vary during the charging of the battery is being monitored. However, the internal pressure or the temperature may alternatively be monitored to control the operation of the pulsing switch 14.

The charger is made operable over a wide range of temperatures by employing an ambient temperature sensor 16 to control the voltage at which the battery voltage sensor 15 will cause the pulsing switch 14 to operate. Batteries are generally rated for operation at room temperature, or at 70° Fahrenheit. Above this temperature the battery will charge more rapidly than it will below this temperature. Therefore, the ambient temperature sensor 16 will cause the charger to shut off sooner at higher temperatures by making the battery voltage sensor 15 responsive to lower terminal voltages, and conversely, the ambient temperature sensor 16 will make the charger remain on for a longer period of time at lower temperatures by making the battery voltage sensor 15 responsive to higher voltages at the lower temperatures.

An example of a usage of a battery wherein the battery will be subjected to temperature extremes is where the battery is employed for the electrical starting of a chain saw. The chain saw may be used during the winter, thereby subjecting the battery to temperatures even below the freezing point. The chain saw may also be employed in jungles or during the summer months thereby subjecting the battery to temperatures higher than the temperature at which the batteries are rated.

The charger of FIG. 5 further includes a load switch 17 between a load 18 and the batetry 11. The load switch 17 couples the load 18 to the battery 11 at the end of the pulse of the charging current in response to the battery voltage sensor 15 and the occurrence of the critical value of terminal voltage across the battery. The load 18 therefore will discharge the battery 11 to depolarize the electrodes and electrolyte so that the battery may be further charged and at a faster rate.

As seen from FIG. 3 the charging current as initially applied, remains on for a long period of time during the initial charging pulse. Thereafter, the critical terminal voltage is reached more rapidly and the charging current is interrupted more frequently. At the end of each charging pulse the discharge current flows through the load 18. The occurrence of the discharge current therefor through the load 18 becomes more frequent as the battery approaches a fully-charged condition.

A preferred embodiment of the battery charger of FIG. 5 is shown in schematic form in FIG. 7. The direct-current source 10 is coupled to the battery 11 through a source switch 12 which is essentially a circuit breaker with a movable contact 30 responsive to a particular level of current through windings 31 and 32. The current regulator 13 and motor timer 19 of FIG. 5 are not shown in FIG. 7.

A pulsing switch and a voltage sensor comparable to the pulsing switch 14 and the battery voltage sensor 15 of FIG. 5 are shown in schematic form in FIG. 7. The battery voltage sensor includes Zener diodes 33 and 34 and resistor 35 connected in series directly across the terminals of battery 11. The pulsing switch includes silicon controlled rectifier 36 having its gate terminal 36a connected to the junction between Zener diode 34 and resistor 35 thereby making it responsive to the voltage sensing circuit. The pulsing switch further includes a relay winding $W_B$ with its four contacts $B_1$ through $B_4$, with contacts $B_1$ and $B_3$ being normally open and contacts $B_2$ and $B_4$ being normally closed for an unenergized relay. The pulsing switch further includes a relay winding $W_A$ having a normally closed contact $A_1$ and a normally open contact $A_2$. Contact $A_2$ of relay winding $W_A$ corresponds to the load switch 17 of FIG. 5 and is responsive to the battery voltage sensor through the action of silicon controlled rectifier 36 and relay winding $W_B$. The pulsing switch further includes a capacitor 37 and a series combination of resistor 38 and potentiometer 39 which are connected across the capacitor 37. The capacitor 37 and its parallel circuit of resistor 38 and potentiometer 39 are connected through relay contact $B_3$ and relay winding $W_B$ to the silicon controlled rectifier 36.

Figure 8:
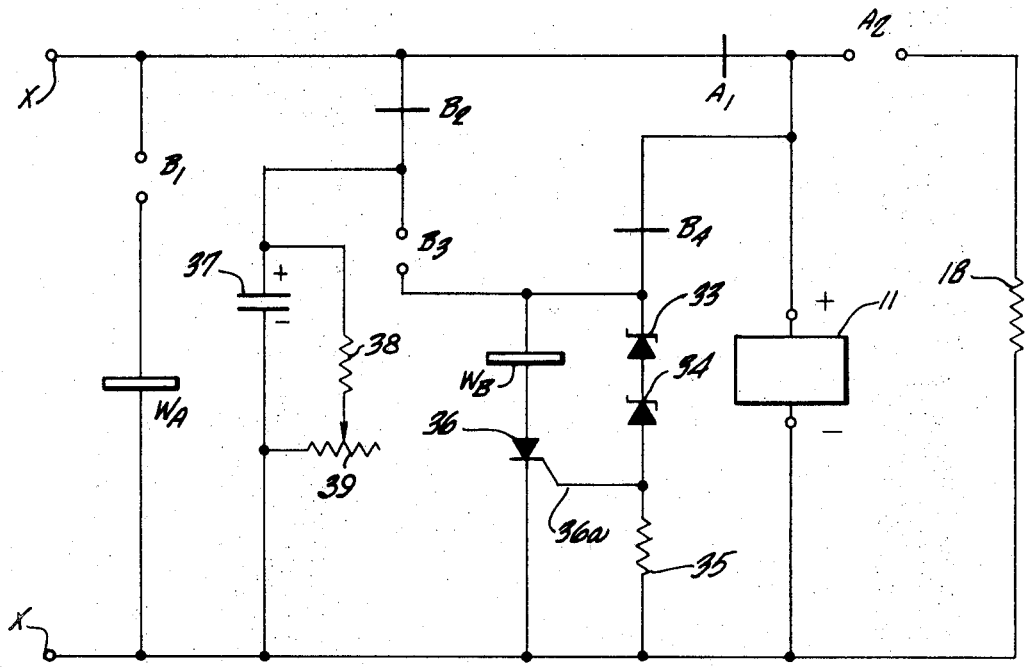
FIGS. 8 and 9 are schematic diagrams of a portion of the battery charger of FIG. 7.

The operation of the charging circuit may be seen more clearly from FIG. 8 which is a schematic diagram of a portion of the circuit of FIG. 7. Where the normally open contacts of the relays appear in the circuit the lines are broken to indicate an open circuit.

Upon the application of charging current across the terminals X—X of the circuit of FIG. 8, the current will flow through the normally closed contact $A_1$ to charge the battery 11. As the battery charges its terminal voltage rises and when the critical voltage is reached above which excessive gassing takes place, the pulsing switch of the charger operates to remove the charging current. This is accomplished in the following manner.

The voltage divider circuit or the battery voltage sensor of Zener diodes 33, 34 and resistor 35 is designed so that the Zener diodes break down when the critical terminal voltage of the battery is reached. It will be assumed for purposes of illustration that this voltage is 1.5 volts and that the battery being charged is a type Sub-C cell.

Figure 9:
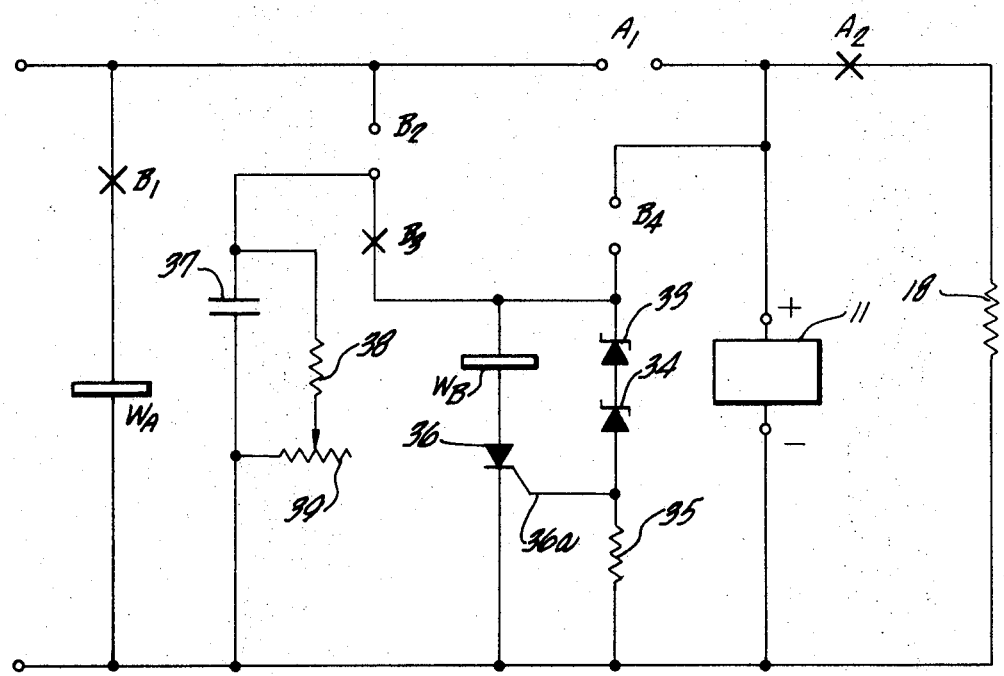

Upon the breaking down of Zener diodes 33 and 34 voltage is developed across resistor 35 which appears at the gate terminal 36a of silicon controlled rectifier 36. The silicon controlled rectifier 36 will fire and current will be conducted through relay winding $W_B$ and silicon controlled rectifier 36 through the normally closed relay contacts $A_1$ and $B_4$ from the terminals X—X. Current flow through the relay winding $W_B$ will activate this relay to open contacts $B_2$ and $B_4$ and to close the contacts $B_1$ and $B_3$. Upon the closing of contact $B_1$, relay winding $W_A$ is placed directly across the terminals X—X and will thus be activated. The activation or energization of relay winding $W_A$ will open contact $A_1$ and close contact $A_2$. This condition is shown in FIG. 9. Prior to the activation of relay winding $W_B$ the capacitor 37 will charge through the normally closed contact $B_2$. Upon the opening of contact $B_2$ and the closing of contact $B_3$, which condition is shown in FIG. 9, the capacitor 37 will discharge through the resistor 38 and potentiometer 39 and the parallel paths of relay winding $W_B$ and silicon controlled rectifier 36 and the series combination of Zener diodes 33, 34 and resistor 35. Therefore, by adjusting the resistance in the path of resistors 38 and 39 which are in parallel with the other two paths for the discharge of capacitor 37, the time of discharge is adjustable. Consequently, the period of time that the relay winding $W_B$ remains energized by current flow from the capacitor 37 is dependent upon the length of time it takes for the capacitor 37 to discharge, which time is adjustable.

When the charger is in the condition shown in FIG. 9 the battery 11 will be discharged through the load 18 which is shown as a resistor 18 in FIGS. 7 through 9. It is desired that the battery be discharged for only a short period of time so that the charging pulses can again be applied to further charge the battery.

In particular, it has been found for a type Sub-C cell that a discharge current of thirty amperes for one-half second is appropriate. Therefore, for this type of cell the time constant for the discharging of capacitor 37 and the deenergizing of relay winding $W_B$ may be adjusted for the one-half second period. Upon the deenergization of relay winding $W_B$ contacts $B_2$ and $B_4$ will again close and contacts $B_1$ and $B_3$ will open. The opening of contact $B_1$ will deenergize relay winding $W_A$ and the contact $A_1$ will close and the contact $A_2$ will open. This again applies a charging current to the battery to further charge the battery and the circuit condition of FIG. 8 again exists.

Two alternative circuits for terminating the charging of the battery 11 are shown in FIG. 7. One circuit monitors the level of the average load current while the other circuit monitors the terminal voltage of the battery under a known load. The circuitry for terminating the charge in response to the attainment of a particular level of average load current includes the winding 32 of source switch 12, which winding is connected in series with the load 18 across the battery 11. As the charging pulses become shorter and the occurrences of current flow through the load 18 increases the average current through the load per unit time increases to a point where the current flow through winding 32 will cause movable contact 30 of source switch 12 to remove the charging current path. The level of average charging current that will activate the source switch 12 is selected to correspond to a desired charge condition of the battery that is being charged.

As the battery approaches full charge, the charging current is applied for a shorter and shorter period of time. The time of application of the charging current approaches the time of application of the load and the occurrence of the discharging current. If the charging current and discharging current are of the same magnitude the charging times and discharging times will be nearly equal so that the amount of energy put into the battery during the charging cycle is substantially equal to the amount of energy removed from the battery during the discharging cycle when the battery is substantially fully charged. If the charging current is less than the discharging current, then an additional amount of time will be required to replace the energy during the charging cycle that is removed during the discharging cycle. For example, if a type Sub-C cell is being charged, at a five-ampere rate and discharged at a thirty-ampere rate for one-half second, then the charging cycle would be approximately three seconds when the battery is substantially fully charged. Under these circumstances, when the battery is fully charged the average load current would be approximately eight and one-half amperes. Thus, by making the source switch 12 responsive to a current of eight and one-half amperes through the winding 32 which indicates a fully charged cell, the charging current path will be opened to end the charging of the type Sub-C cell.

The charge termination circuit is applicable to the charging of any cell or battery by making the source switch 12 responsive to a particular average load current that is dependent upon the battery or cell that is being charged and the magnitude of charging current and discharging current. This charge termination circuitry has the added advantage that the cell or battery being charged will never be overcharged.

What is claimed is:

1. A method of rapidly charging a battery comprising the steps of imposing an increasing charge on a battery by charging the battery during a plurality of charging intervals; providing other intervals interspersed with said charging intervals; and causing the frequency of said other intervals to increase as charging of said battery progresses.

2. A method of rapidly charging a battery comprising the steps of imposing an increasing charge on a battery by charging the battery during a plurality of charging intervals, and providing battery discharge intervals interspersed with said charging intervals; and causing the duration of intervals of said charging to diminish as said charge in said battery increases.

3. A method of rapidly charging a battery comprising the steps of imposing an increasing charge on a battery by charging the battery during a plurality of charging intervals, and providing battery discharge intervals interspersed with said charging intervals; and causing the frequency of said discharging intervals to increase as said charge in said battery increases.

4. A method of rapidly charging a battery comprising the steps of imposing an increasing charge on a battery by charging the battery during a plurality of charging intervals, and providing battery discharge intervals interspersed with said charging intervals; causing the frequency of said discharging intervals to increase as said charge on said battery increases; causing the duration of intervals of said charging to diminish as said charge on said battery increases; and causing the quotient of the duration of a charging interval divided by the duration of a succeeding discharging interval to diminish as said charge on said battery increases.

5. A method of rapidly charging a battery comprising the steps of imposing an increasing charge on a battery by charging the battery during a plurality of charging intervals, and discharging the battery during discharging intervals interspersed with said charging intervals, effecting said charging with charge current exceeding the nominal one-hour rate of the cells of said battery; maintaining the duration of each interval of charging as a function of a condition of said battery; and in response to a predetermined battery condition, causing the duration of intervals of said charging to diminish as said charging and discharging progresses.

6. A method of rapidly charging a battery comprising the steps of imposing an increasing charge on a battery by charging the battery during a plurality of charging intervals, and discharging the battery during discharging intervals interspersed with said charging intervals, effecting said charging with charge current exceeding the nominal one-hour rate of the cells of said battery; maintaining the duration of each interval of charging as a function of a condition of said battery; and in response to a predetermined battery condition, causing the frequency of said discharging intervals to increase as said charging and discharging progresses as said battery increases.

7. A method of rapidly charging a battery comprising the steps of imposing an increasing charge on a battery by charging the battery during a plurality of charging intervals, and providing battery discharge intervals interspersed with said charging intervals; causing the duration of intervals of said charging to diminish as said charge in said battery increases, thereby causing the frequency of said discharging intervals to increase and the quotient of the duration of a charging interval divided by the duration of a succeeding discharging interval to diminish as said charge on said battery increases.

8. A method of rapidly charging a battery comprising the steps of imposing an increasing charge on a battery by charging the battery during a plurality of charging intervals, and providing battery discharge intervals interspersed with said charging intervals; causing the frequency of said discharging intervals to increase as said charge in said battery increases, thereby causing the duration of intervals of said charging to diminish and the quotient of the duration of a charging interval divided by the duration of a succeeding discharging interval to diminish as said charge on said battery increases.

9. A method of rapidly charging a battery comprising the steps of imposing an increasing charge on a battery by charging the battery during a plurality of charging intervals, and discharging the battery during discharging intervals interspersed with said charging intervals, effecting said charging with charge current exceeding the nominal one-hour rate of the cells of said battery; maintaining the duration of each interval of charging as a function of a condition of said battery; in response to a predetermined battery condition, causing the duration of intervals of said charging to diminish as said charging and discharging progresses, thereby causing the frequency of said discharging intervals to increase and the quotient of the duration of a charging interval divided by the duration of a succeeding discharging interval to diminish as said charging and discharging progresses.

10. A method of rapidly charging a battery comprising the step of imposing an increasing charge on a battery by charging the battery during a plurality of charging intervals, and discharging the battery during discharging intervals interspersed with said charging intervals, effecting said charging with charge current exceeding the nominal one-hour rate of the cells of said battery; maintaining the duration of each interval of charging as a function of a condition of said battery; in response to a predetermined battery condition, causing the frequency of said discharging intervals to increase as said charging and discharging progesses as said battery increases, thereby causing the duration of intervals of said charging to diminish and the quotient of the duration of a charging interval divided by the duration of a succeeding discharging interval to diminish as said charging and discharging progresses.

11. A method of rapidly charging a battery comprising the steps of imposing an increasing charge on a battery by charging the battery during a plurality of charging intervals, and discharging the battery during discharging intervals interspersed with said charging intervals, effecting said charging with charge current exceeding the nominal one-hour rate of the cells of said battery; maintaining the duration of each interval of charging as a function of a condition of said battery; in response to a predetermined battery condition causing the frequency of the intervals of discharging to increase as said charging and discharging progresses; in response to said predetermined battery condition, causing the duration of intervals of said charging to diminish as said charging and discharging progresses; and in response to said predetermined battery condition, causing the quotient of the duration of a charging interval divided by the duration of a succeeding discharging interval to diminish as said charging and discharging progresses.

12. A battery charging circuit comprising a source of charging current; and circuit means for periodically transmitting charging current from said source to a battery to apply charging intervals to said battery operable to impose an increasing charge on said battery, said circuit means being operable to provide other intervals interspersed with said charging intervals, with the frequency of said other intervals increasing as charging of said battery progresses.

13. A battery circuit comprising a source of current greater than the nominal one-hour rate of the cells of a battery; a load; and circuit means for alternately connecting said source and said load to said battery to impose an increasing charge on said battery; said circuit means being operable to connect said load with said battery with a frequency which increases as charging of said battery progresses; said circuit means being operable to connect said source with said battery, with the duration of periods of connection between said battery and said source becoming shorter as charging of said battery progresses; and said circuit means being operable to cause a quotient equal to the duration of a period of time during which said source is connected to said battery divided by the duration of a succeeding period of time during which said load is connected to said battery to diminish as charging of said battery progresses.

14. A battery circuit comprising a source of current greater than the nominal one-hour rate of the cells of a battery; a load; and circuit means for alternately connecting said source and said load to said battery to impose an increasing charge on said battery, with said source being connected to said battery for periods of time related to a condition of said battery; said circuit means being operable to connect said source with said battery, with the duration of periods of connection between said battery and said source becoming shorter as charging of said battery progresses, and with current applied to said battery exceeding the nominal one-hour rate of the cells of said battery; said circuit means being operable to connect said load with said battery with a frequency which increases as charging of said battery progresses, and with current discharging from said battery at a level which exceeds the current applied to said battery when said source is first connected to said battery; and said circuit means being operable to cause a quotient equal to the duration of a period of time during which said source is connected to said battery divided by the duration of a succeeding period of time during which said load is connected to said battery to diminish as charging of said battery progresses.

References Cited
UNITED STATES PATENTS

| | | | |
|---|---|---|---|
| 2,503,179 | 4/1950 | Tichenor | 320—14 |
| 2,619,624 | 11/1952 | Briggs | 320—14 |
| 3,062,998 | 11/1962 | Gedlar | 320—35 X |
| 3,226,623 | 12/1965 | Krueger et al. | 320—43 |
| 3,293,445 | 12/1966 | Levy | 320—14 X |
| 3,300,704 | 1/1967 | McMillen | 320—61 |
| 3,355,651 | 11/1967 | Olson | 320—31 |
| 2,637,836 | 5/1953 | Kendal et al. | 320—24 |

OTHER REFERENCES

Storage Batteries—Vinal, 1955 4th edition pp. 245, 253–255 relied upon.

J D MILLER, Primary Examiner

J. M. GUNTHER, Assistant Examiner

U.S. Cl. X.R.

320—20, 24, 39